United States Patent [19]
Kashiwagi et al.

[11] Patent Number: 5,901,820
[45] Date of Patent: May 11, 1999

[54] HYDRAULIC SHOCK ABSORBER

[75] Inventors: Akira Kashiwagi, Kanagawa-ken; Takashi Nezu, Tokyo; Takao Nakadate, Kanagawa-ken, all of Japan

[73] Assignee: Tokico Ltd., Kanagawa-ken, Japan

[21] Appl. No.: 08/785,947

[22] Filed: Jan. 22, 1997

[30] Foreign Application Priority Data

Jan. 25, 1996 [JP] Japan ........................................ 8-31479
Feb. 16, 1996 [JP] Japan ........................................ 8-54043

[51] Int. Cl.$^6$ ................................ B60G 17/08; F16F 9/50
[52] U.S. Cl. ............................... 188/266.6; 188/322.13; 188/322.2
[58] Field of Search ................................ 188/266.2, 266, 188/4, 266.6, 314, 318, 315, 319.1, 322.2, 322.13

[56] References Cited

U.S. PATENT DOCUMENTS

| | | | |
|---|---|---|---|
| 4,064,977 | 12/1977 | Taylor | 188/314 |
| 4,515,253 | 5/1985 | Itoh | 188/314 |
| 5,163,538 | 11/1992 | Derr et al. | 188/322.2 |
| 5,180,039 | 1/1993 | Axthammer et al. | 188/322.2 |
| 5,284,330 | 2/1994 | Carlson et al. | 267/140.14 |
| 5,301,412 | 4/1994 | Hahn et al. | 188/322.2 |
| 5,301,776 | 4/1994 | Beck | 188/322.2 |
| 5,303,804 | 4/1994 | Spiess | 188/319 |
| 5,375,683 | 12/1994 | Huang et al. | 188/322.13 |
| 5,409,088 | 4/1995 | Sarstaod | 188/299 |
| 5,431,259 | 7/1995 | Mizutani et al. | 188/318 |
| 5,472,070 | 12/1995 | Feigel | 188/322.2 |
| 5,624,010 | 4/1997 | Huang et al. | 188/322.13 |
| 5,649,611 | 7/1997 | Nakadate | 188/266.6 |
| 5,655,633 | 8/1997 | Nakadate et al. | 188/266.6 |

FOREIGN PATENT DOCUMENTS

3108117 A1 9/1982 Germany.
3313613 C2 7/1989 Germany.

OTHER PUBLICATIONS

"Abschluss–und Regelorgane", *Maschinenkonstruktionsluhre*, Von Prof. Dipl.–ling A. Leyer, TH Stuttgart, Jun. 1968, p. 1155.

*Primary Examiner*—Chris Schwartz
*Attorney, Agent, or Firm*—Wenderoth, Lind & Ponack, L.L.P.

[57] ABSTRACT

A piston is slidably fitted in a cylinder for dividing the interior of the cylinder into upper and lower cylinder chambers. The upper cylinder chamber communicates with the lower cylinder chamber through a check valve. The lower cylinder chamber communicates with a reservoir through a check valve. The upper cylinder chamber communicates with the lower cylinder chamber through an extending side damping valve. The lower cylinder chamber communicates with the reservoir through a contracting side damping valve. A piston rod is connected to the piston. When the piston rod is in an extending stroke, a damping force is generated by the extending side damping valve. When the piston rod is in a compressing stroke, a damping force is generated by a contracting side damping valve. The reservoir includes a connecting hole having an opening. A baffle plate is provided within the reservoir and above the opening of the connecting hole. Arrangement of the baffle plate above the opening of the connecting hole defines an entrance portion through which hydraulic fluid flows from the connecting hole to the reservoir. The cross sectional flow area of the entrance portion is gradually expanded, thereby decreasing the flow velocity of the hydraulic fluid to restrain generation of eddies to prevent cavitation and aeration.

15 Claims, 11 Drawing Sheets

HYDRAULIC SHOCK ABSORBER

BACKGROUND OF THE INVENTION

The present invention relates to a hydraulic shock absorber mounted on a suspension system and the like of a vehicle such as an automobile.

The following is an example of a hydraulic shock absorber in the related art which is mounted on a suspension system and the like of a vehicle such as an automobile. This type of hydraulic shock absorber comprises: a cylinder containing hydraulic fluid sealed therein; a reservoir containing hydraulic fluid and gas sealed therein; a piston slidably fitted in the cylinder for dividing the interior of the cylinder into a first chamber and a second chamber; a piston rod including one end connected to the piston and an opposite end extending through the first chamber out of the cylinder; a first communication passage communicating between the first and second chambers; a first check valve provided in the first communication passage for permitting only flow of the hydraulic fluid from the second chamber to the first chamber; a second communication passage communicating between the second chamber and the reservoir; a second check valve provided in the second communication passage for permitting only flow of the hydraulic fluid from the reservoir to the second chamber; an extending side passage communicating between the first chamber and the second chambers; an extending side damping force generating mechanism (an orifice, a disc valve, and so on) for controlling flow of the hydraulic fluid in the extending side passage to generate a damping force; a contracting side passage communicating between the second chamber and the reservoir; and a contracting side damping force generating mechanism (an orifice, a disc valve, and so on) for controlling flow of the hydraulic fluid in the contracting side passage to generate a damping force.

By employing the above construction, when the piston rod is in the extending stroke, the resulting piston movement causes the first check valve to be closed so that the hydraulic fluid in the first chamber is pressurized to flow through the extending side passage into the second chamber. The damping force is then generated by the extending side damping force generating mechanism. Hydraulic fluid flows from the reservoir through the second communication passage into the second chamber by the same amount as the piston rod comes out of the cylinder. When the piston rod is in a compressing stroke, the first check valve is opened so that the pressure of the hydraulic fluid in the first chamber is substantially identical to that of the hydraulic fluid in the second chamber. Hydraulic fluid then flows from the second chamber through the contracting side passage into the reservoir by the same amount as the piston rod comes into the cylinder, and the damping force is then generated by the extending side damping force generating mechanism.

The above common hydraulic shock absorber includes a reservoir 100, a passage (or contracting side passage) 102 communicating with the reservoir 100, and an entrance portion 104 to the reservoir 100 as shown in FIG. 13. The cross sectional area of the passage 102 suddenly becomes large at the entrance portion 104. Thus, when the piston moves at a high speed at the compressing stroke of the piston rod so that the hydraulic fluid from the passage 102 to the reservoir 100 flows at a high speed, the flow of the hydraulic fluid leaves a wall surface 108, partly defining the reservoir 100, to become a jet, thereby generating eddies 106 around the flow jet of the hydraulic fluid. A reference numeral 110 designates the level of the hydraulic fluid in the reservoir 100.

The generation of the eddies 106 in the reservoir 100 causes bubbles to be created about the central portion of the eddies at the low pressure portion thereof, thereby causing a damping force to be made unstable due to cavitation. In this state, the gas in the reservoir 100 tends to easily penetrate into the hydraulic fluid. Thus when for example a large amount of gas is penetrated into the hydraulic fluid, it substantially brings about aeration. In particular, the generation of the eddies and the bubbles about the level 110 of the hydraulic fluid contained in the reservoir causes the gas in the reservoir 100 to more easily penetrate into the hydraulic fluid. When the piston rod is in the extending stroke, the pressure of the hydraulic fluid in the second chamber is lowered, thereby permitting the gas contained in the hydraulic fluid flowing into the second chamber from the reservoir 100 to form bubbles in the second chamber to cause aeration, thereby allowing a damping force to be unstable. In a case where the reservoir has a small volume, the level of the hydraulic fluid can not be sufficiently heightened. Thus, in particular when a high damping force is required, the small volume reservoir tends to easily cause cavitation and aeration.

SUMMARY OF THE INVENTION

In view of the drawbacks of the above related arts, it is an object of the present invention to provide a hydraulic shock absorber which can prevent generation of eddies by flowing hydraulic fluid into the reservoir to thereby provide a stable damping force.

To this end, the present invention provides a hydraulic shock absorber comprising: a cylinder containing hydraulic fluid sealed therein; a reservoir containing hydraulic fluid and gas sealed therein; a piston slidably fitted in the cylinder for dividing the interior of the cylinder into two cylinder chambers; a piston rod including one end connected to the piston and an opposite end extending out of the cylinder; a first hydraulic fluid passage communicating between the two cylinder chambers; a second hydraulic fluid passage communicating between one of the two cylinder chambers and the reservoir; and means for controlling flow of the hydraulic fluid in the first and second hydraulic fluid passages caused by the stroke of the piston rod to generate a damping force; the hydraulic shock absorber further including an entrance portion from the second hydraulic fluid passage to the reservoir, the entrance portion being shaped to gradually decrease the flow velocity of the hydraulic fluid flowing from the second hydraulic fluid passage into the reservoir.

According to an embodiment of the present invention, the entrance portion includes a flow path through which the hydraulic fluid flows from the second hydraulic fluid passage into the reservoir, the flow path of the entrance portion has a cross sectional area, and the cross sectional area of the flow path is gradually increased from the second hydraulic fluid passage to the reservoir.

By employing the above construction, the flow velocity of the hydraulic fluid flowing from the second hydraulic fluid passage into the reservoir is gradually lowered at the entrance portion to the reservoir, thereby substantially preventing the flow of the hydraulic fluid from leaving a wall surface partly defining the reservoir and restraining the generation of the eddies.

According to an embodiment of the present invention, the second hydraulic fluid passage includes an opening communicating with the reservoir through the entrance portion, and the hydraulic shock absorber further comprises a baffle plate provided within the reservoir and above the opening of the second hydraulic fluid passage.

By employing the above construction, the flow velocity of the hydraulic fluid flowing from the second hydraulic fluid passage into the reservoir is gradually lowered at the entrance portion to the reservoir, thereby substantially preventing the flow of the hydraulic fluid from leaving a wall surface partly defining the reservoir and restraining the generation of the eddies. The arrangement of the baffle plate enables the generation of the eddies to be separated from the hydraulic fluid level of the reservoir.

According to an embodiment of the present invention, the baffle plate includes, at opposite sides thereof, projections extending downwardly to cover the upper side of the opening.

According to an embodiment of the present invention, the baffle plate has a box-like shape to cover the upper and lateral sides of the opening.

According to an embodiment of the present invention, the hydraulic shock absorber further comprises an outer cylindrical case and a cylindrical baffle plate provided between the outer cylindrical case and the cylinder, the cylinder and the outer cylindrical case defining therebetween the reservoir, and the baffle plate including an opening which is larger than the second hydraulic fluid passage and is positioned to face thereto. The hydraulic shock absorber further comprises a passage element provided between the baffle plate and the second hydraulic fluid passage, the passage element including a passage communicating between the second hydraulic fluid passage and the opening of the baffle plate, and being larger than the second hydraulic fluid passage and smaller than the opening of the baffle plate. The passage of the passage element and the opening of the baffle plate define the entrance portion.

According to an embodiment of the present invention, the baffle plate has an annular passage defined between the baffle plate and the cylinder and communicating between the opening of the baffle plate and the reservoir.

According to an embodiment of the present invention, the second hydraulic fluid passage includes an opening to the reservoir, the hydraulic shock absorber further comprising a diffuser disposed around the opening of the second hydraulic fluid passage, the diffuser constituting the entrance portion.

According to an embodiment of the present invention, the second hydraulic fluid passage includes an opening to the reservoir, the opening of the second hydraulic fluid passage having a cross sectional flow area which is gradually expanded as the second hydraulic fluid passage extends to the reservoir.

According to an embodiment of the present invention, the baffle plate is fabricated of a resilient material.

According to an embodiment of the present invention, one of the two cylinder chambers is a lower cylinder chamber and the other is an upper cylinder chamber, and the second hydraulic fluid passage communicates between the lower cylinder chamber and the reservoir.

Other features and advantages of the present invention will become apparent to those skilled in the art upon review of the following detailed description, claims and drawings.

Figure 1:
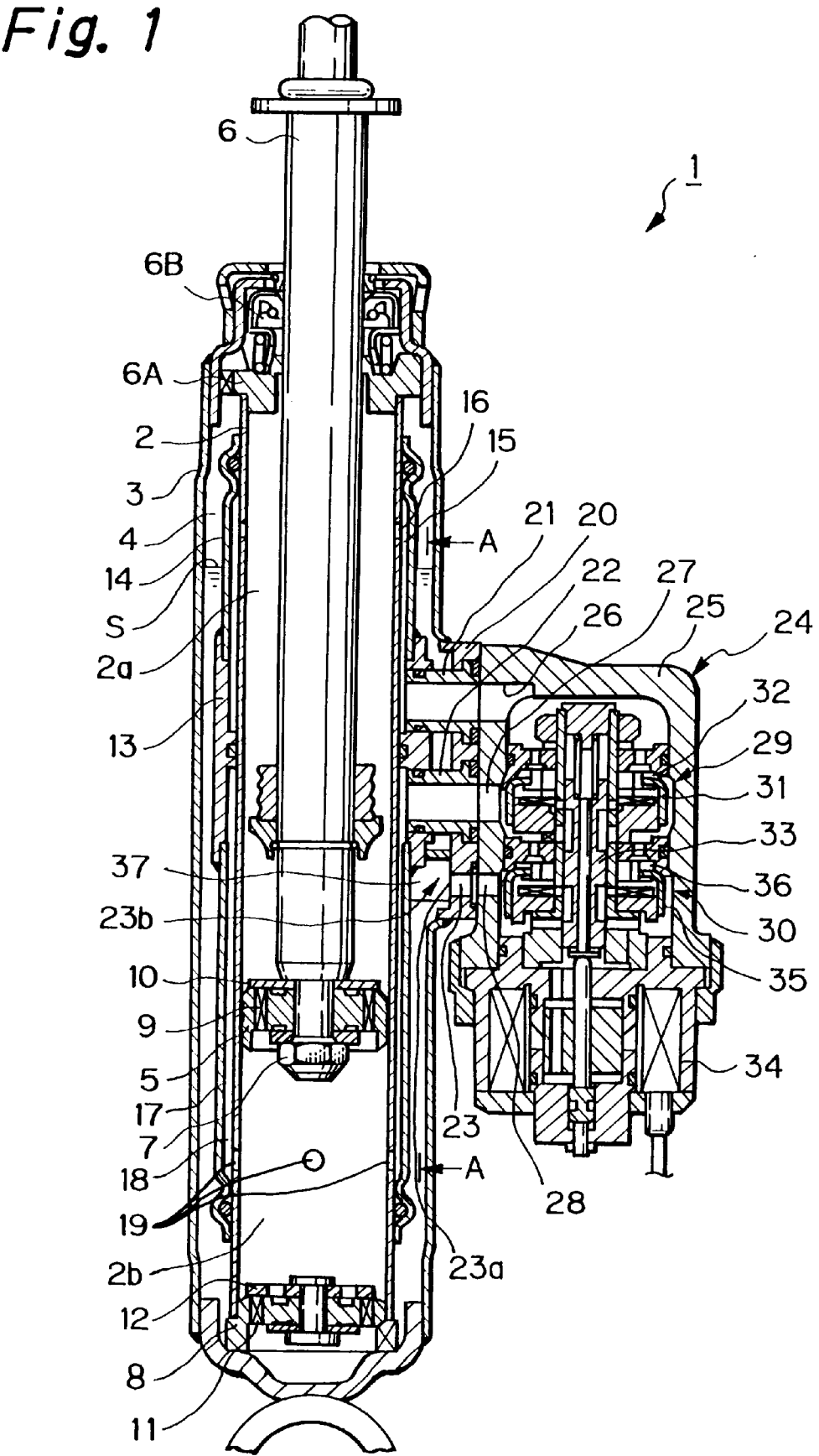
FIG. 1 is a vertical section of a hydraulic shock absorber according to a first embodiment of the present invention.

Before embodiments of the present invention are explained in detail, it is to be understood that the invention is not limited in its application to the details of the construction and the arrangements of components set forth in the following description or illustrated in the drawings. The invention is capable of other embodiments and of being practiced or being carried out in various ways. Also, it is understood that the phraseology and terminology used herein is for the purpose of description and should not be regarded as limiting.

DETAILED DESCRIPTION OF THE PREFERRED EMBODIMENTS

Embodiments of the present invention will be described below in detail with reference to the accompanying drawings. Please note that each of the embodiments of the invention is applied to a damping force adjusting type of hydraulic shock absorber.

A first embodiment of the hydraulic shock absorber according to the present invention will be described with reference to FIGS. 1 to 3 and 9. FIG. 3 is a hydraulic circuit diagram of the damping force adjusting type of hydraulic shock absorber. In FIG. 3, the same reference numerals are applied to elements corresponding to those shown in FIGS. 1 and 2.

Figure 2:
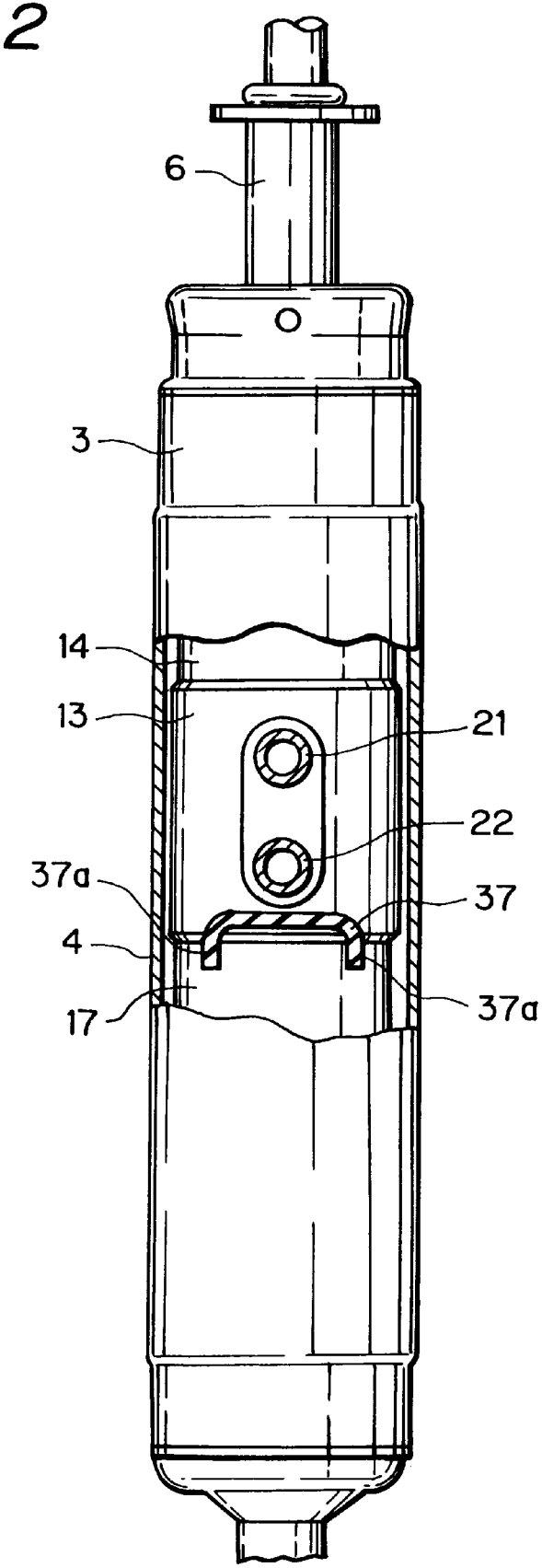
FIG. 2 is a partially cutaway view taken along line A—A of FIG. 1.
Figure 3:
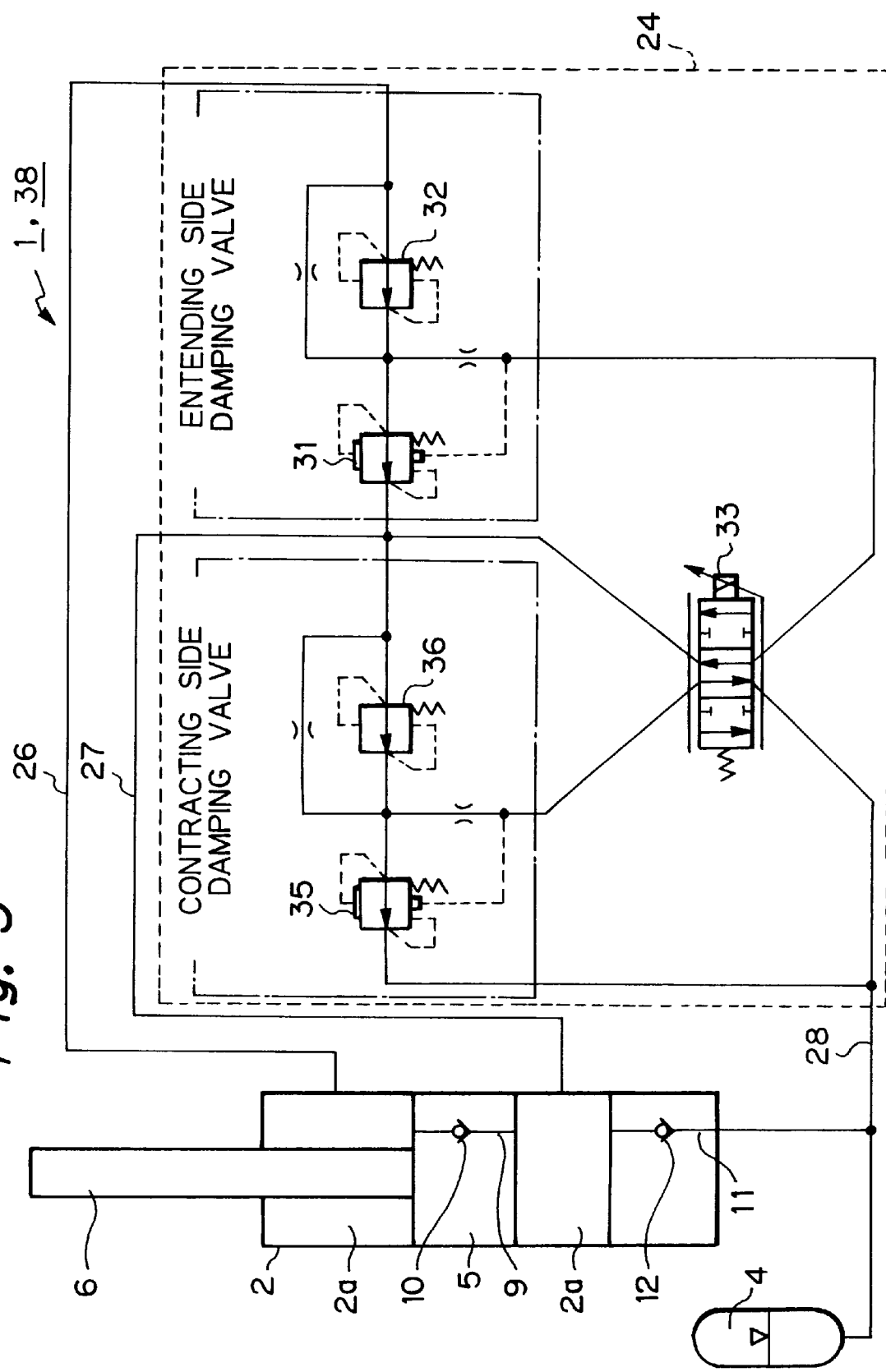
FIG. 3 is a hydraulic circuit diagram.

As shown in FIGS. 1 to 3, a damping force adjusting type of hydraulic shock absorber 1 comprises a cylinder 2 and an outer cylindrical case 3 provided outside the cylinder to have a double cylindrical construction. A reservoir 4 is defined between the cylinder 2 and the outer cylindrical case 3. A piston 5 is slidably fitted in the cylinder 2 for dividing the interior of the cylinder 2 into two cylinder chambers, namely an upper cylinder chamber 2a and a lower cylinder chamber 2b. A piston rod 6 includes an inner end and an outer end. The inner end of the piston rod 6 is connected to the piston 5 by a nut 7. The outer end of the piston rod 6 extends out of the cylinder 2 through the upper cylinder chamber 2a and through a rod guide element 6A and a seal element 6B which are mounted on the upper end portions of the cylinder 2 and the outer cylindrical case 3. The cylinder 2 includes, at the lower end thereof, a base valve 8 for defining the lower cylinder chamber 2b and the reservoir 4. The cylinder 2 contains hydraulic fluid sealed therein. The reservoir 4 contains hydraulic fluid and gas sealed therein.

The piston 5 includes an oil passage 9 for communicating between the upper cylinder chamber 2a and the lower cylinder chamber 2b. The piston 5 also includes in the oil passage 9 thereof a check valve 10 for permitting flow of the hydraulic fluid from the lower cylinder chamber 2b to the upper cylinder chamber 2a and preventing flow thereof from the upper cylinder chamber 2a to the lower cylinder chamber 2b. The base valve 8 includes an oil passage 11 for communicating between the lower cylinder chamber 2b and the reservoir 4. The base valve also includes in the oil passage 11 thereof a check valve 12 for permitting flow of the hydraulic fluid from the reservoir 4 to the lower cylinder chamber 2b and preventing flow thereof from the lower cylinder chamber 2b to the reservoir 4.

The cylinder 2 has a generally cylindrical passage element 13 fitted around the middle circumference thereof. The cylinder 2 also has an upper tube 14 fitted around the upper circumference thereof. The lower end of the upper tube 14 is connected to the passage element 13. An annular oil passage 15 is defined between the cylinder 2 and the upper tube 14. The cylinder 2 includes a side wall. The side wall of the cylinder 2 has about the upper end thereof an oil passage 16. The annular oil passage 15 communicates with the upper cylinder chamber 2a through the oil passage 16. The cylinder 2 has a lower tube 17 fitted around the lower circumference thereof. The upper end of the lower tube 17 is connected to the passage element 13. An annular oil passage 18 is defined between the cylinder 2 and the lower tube 17. The side wall of the cylinder 2 has about the lower end thereof an oil passage 19. The annular oil passage 18 communicates with the lower cylinder chamber 2b through the oil passage 19. A connecting plate 20 is connected to the outer cylindrical case 3 so as to be opposed to the passage element 13. A connecting pipe 21 communicating with the annular oil passage 15 is fitted into the connecting plate 20 and the passage element 13. A connecting pipe 22 communicating with the annular oil passage 18 is fitted into the connecting plate 20 and the passage element 13. The connecting plate 20 has a connecting hole 23 communicating with the reservoir 4. A damping force generating mechanism 24 is mounted on the connecting plate 20.

The damping force generating mechanism 24 includes a casing 25. The casing 25 has oil passages 26, 27, and 28 communicating with the connecting pipe 21, the connecting pipe 22, and the connecting hole 23, respectively. The casing 25 includes an extending side damping valve 29 (as a controlling means) for controlling the flow of the hydraulic fluid between the oil passages 26 and 27 to generate a damping force. The casing 25 also includes a contracting side damping valve 30 (as a controlling means) for controlling the flow of the hydraulic fluid between the oil passages 27 and 28 to generate a damping force. A first hydraulic fluid passage for communicating between the upper and lower cylinder chambers 2a and 2b comprises the oil passage 16, the annular oil passage 15, the connecting pipe 21, the oil passage 26, the oil passage 27, the connecting pipe 22, the annular oil passage 18, and the oil passage 19. A second hydraulic fluid passage for communicating between the lower cylinder chamber 2b and the reservoir 4 comprises the oil passage 19, the annular oil passage 18, the connecting pipe 22, the oil passage 27, the oil passage 28, and the connecting hole 23.

The extending side damping valve 29 comprises a main valve 31 which is a pilot type of pressure control valve, a sub-valve 32 which is a pressure control valve, and a pilot valve 33 (or a spool valve) which is a variable flow control valve. The pilot valve 33 is actuated by a solenoid actuator 34 (referred to as "actuator 34" hereinafter) to vary the cross sectional area of the flow path between the oil passages 26 and 27, thereby directly adjusting the orifice characteristic (which means that the damping force is approximately proportional to the square of the piston speed), and thereby changing the pilot pressure to vary the valve opening pressure of the main valve 31 to adjust the valve characteristic (which means that the damping force is approximately proportional to the piston speed). The sub-valve 32 serves to restrain an excessive damping force to obtain a suitable damping force in the lower speed range of the piston speed, namely the orifice characteristic range.

The contracting side damping valve 30 comprises a main valve 35 which is a pilot type of pressure control valve, a sub-valve 36 which is a pressure control valve, and the pilot valve 33. The pilot valve 33 is shared between the extending side damping valve 29 and the contracting side damping valve 30. In the same manner as the extending side damping valve 29, the pilot valve 33 is actuated by the actuator 34 to vary the cross sectional area of the flow path between the oil passages 27 and 28, thereby directly adjusting the orifice characteristic, and thereby changing the pilot pressure to vary the valve opening pressure of the main valve 35 to adjust the valve characteristic. The sub-valve 36 serves to restrain an excessive damping force to obtain a suitable damping force in the lower speed range of the piston speed, namely the orifice characteristic range.

Figure 9:
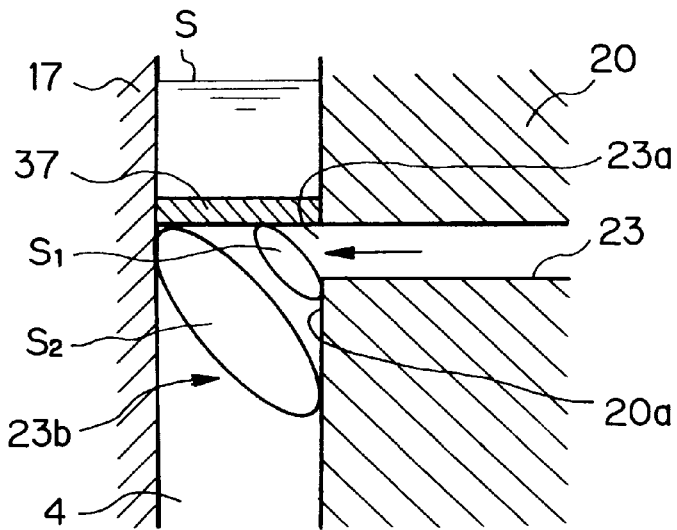
FIG. 9 is a schematic sectional view showing, on an enlarged scale, an entrance portion from a connecting hole to a reservoir, which is a main portion of the apparatus shown in FIG. 1.

The connecting hole 23 (as a second hydraulic fluid passage) has an opening 23a at the reservoir side thereof. The reservoir 4 includes therein a generally inverted U-shaped baffle plate 37. The baffle plate 37 is provided above the opening 23a of the connecting hole 23 within the reservoir 4. Part of lower tube 17, the part of the connecting plate 20, and the baffle plate 37 define an entrance portion 23b extending from the opening 23a of the connecting hole 23 to the reservoir 4, and communicating between the connecting hole 23 (as the second hydraulic fluid passage) and the reservoir 4. The entrance portion 23b is shaped to gradually decrease the flow velocity of the hydraulic fluid flowing from the connecting hole 23 into the reservoir 4. With reference to FIG. 9, arrangement of the baffle plate 37 above the opening 23a of the connecting hole 23 defines the entrance portion 23b comprising a flow path through which the hydraulic fluid flows from the connecting hole 23 to the reservoir 4. As shown in FIG. 9, the flow path of the entrance portion 23b has a cross sectional flow area which is gradually expanded, as shown by reference marks $S_1$ and $S_2$, to gradually lower the flow velocity of the hydraulic fluid. The baffle plate 37 includes at the opposite sides thereof projections 37a extending downwardly therefrom to cover the upper side of the opening 23a of the connecting hole 23. The baffle plate 37 is fixedly mounted on at least one of the passage element 13 and the connecting plate 20. The baffle plate 37 is preferably fabricated of a resilient material to enhance the seal at the points of contact, namely between the baffle plate 37 and the passage element 13 and between the baffle plate 37 and the connecting plate 20, and to dampen the flow of the hydraulic fluid striking against the baffle plate 37.

The following is the function of the first embodiment constructed as mentioned above.

When the piston rod 6 is in the extending stroke, the resulting piston movement causes the check valve 10 of the piston 5 to be closed so that the hydraulic fluid in the upper cylinder chamber 2a is pressurized to flow into the oil passage 26 of the damping force generating mechanism 24 through the oil passage 16, the annular oil passage 15, and the connecting pipe 21, and then flow from the oil passage 26 into the lower cylinder chamber 2b through the sub-valve 32, the pilot valve 33, the oil passage 27, the connecting pipe 22, the annular oil passage 18, and the oil passage 19. When the pressure in the upper cylinder chamber 2a reaches the valve opening pressure of the main valve 31, the main valve 31 is opened to allow the hydraulic fluid to flow from the sub-valve 32 directly to the oil passage 27. On the other hand, the hydraulic fluid opens the check valve 12 of the base valve 8 and flows therethrough from the reservoir 4 into the lower cylinder chamber 2b by the same amount as the piston rod 6 comes out of the cylinder 2.

Thus, when the piston rod 6 is in the extending stroke and the piston speed is low, the main valve 31 is closed. Thus, before the main valve 31 is opened, a damping force is generated on the basis of the orifice characteristic according to the cross sectional flow area of the pilot valve 33. When the piston speed is high enough to increase the pressure in the upper cylinder chamber 2a to open the main valve 31, a damping force is generated on the basis of the valve characteristic according to the order of opening of the main valve 31 to restrain an excessive damping force. Adjusting the cross sectional flow area of the pilot valve 33 by the actuator 34 enables the orifice characteristic to be directly controlled, and also enables the pilot pressure of the main valve 31 to be changed to adjust the valve characteristic.

Figure 14:
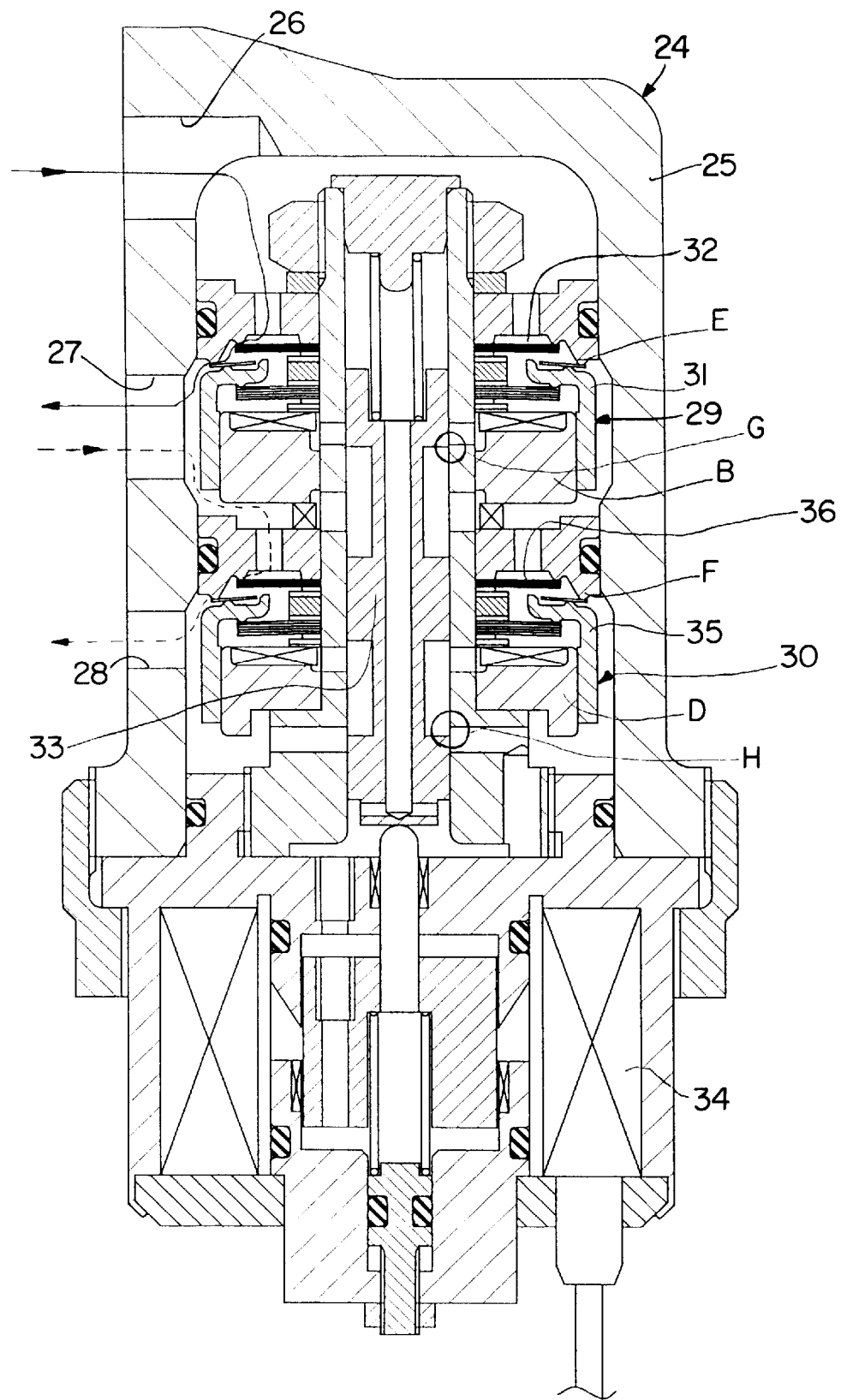
FIGS. 14 and 15 are vertical section views of a part of the hydraulic shock absorber of FIG. 1 illustrating the operation thereof.

When the piston rod 6 is in the extending stroke, the hydraulic fluid in the upper cylinder chamber 2a flows into the oil passage 26 through the oil passage 16, the annular oil passage 15 and the connecting pipe 21. When the damping force is to be weak, an orifice G is adjusted to be closed or small, thereby causing the main valve 31 to be moved down as viewed in FIG. 14, which valve 31 is slidably fitted onto element B constituting the extending side valve 29. Accordingly, the hydraulic fluid follows the path as shown in the solid line of FIG. 14. The downward movement of the main valve 31 allows a gap to be created between extending side valve seat E and the main valve 31. Thereby the hydraulic fluid flows into the oil passage 27 through the gap, and further flows therefrom into the lower cylinder chamber 2b through the oil passages 18 and 19.

Figure 15:
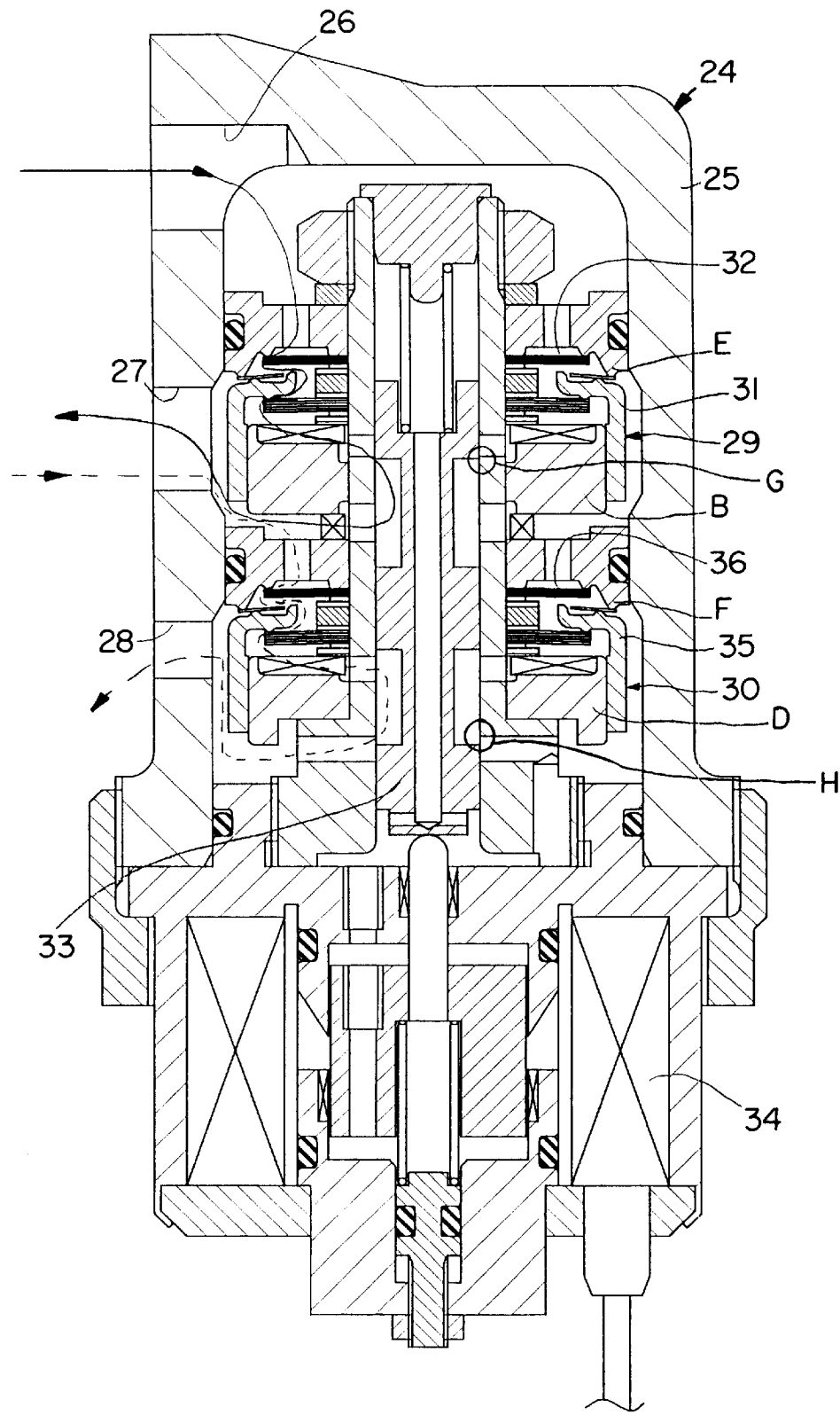

When the damping force is to be strong, the orifice G is adjusted to be open or large, thereby not causing the main valve 31 to be moved down. Accordingly, the hydraulic fluid follows the path as shown in the solid line of FIG. 15.

When the piston rod 6 is in the compressing stroke, the resulting piston movement causes the check valve 10 of the piston 5 to be opened so that the hydraulic fluid in the lower cylinder chamber 2b flows directly into the upper cylinder chamber 2a through the oil passage 9, and so that the pressure in the upper cylinder chamber 2a is substantially equal to that in the lower cylinder chamber 2b, thereby preventing the flow of the hydraulic fluid between the oil passages 26 and 27 of the damping force generating mechanism 24. On the other hand, as the piston rod 6 comes into the cylinder 2, the check valve 12 of the base valve 8 is closed. Thus, the hydraulic fluid in the cylinder 2 is pressurized by the insertion of the piston rod 6 into the cylinder 2 to flow from the lower cylinder chamber 2b into the oil passage 27 of the damping force generating mechanism 24 through the oil passage 19, the annular oil passage 18, and the connecting pipe 22, after which it flows from the oil passage 27 into the reservoir 4 through the sub-valve 36, the pilot valve 33, the oil passage 28, and the connecting hole 23. When the pressure in the upper and lower cylinder chambers 2a and 2b reaches the valve opening pressure of the main valve 35, the main valve 35 is opened to allow the hydraulic fluid to flow from the sub-valve 36 directly to the oil passage 28.

Thus, when the piston rod 6 is in the compressing stroke and the piston speed is low, the main valve 35 is closed. Thus, before the main valve 35 is opened, a damping force is generated on the basis of the orifice characteristic according to the cross sectional flow area of the pilot valve 33. When the piston speed is high to increase the pressure in the upper and lower cylinder chambers 2a and 2b to open the main valve 35, a damping force is generated on the basis of the valve characteristic according to the order of opening of the main valve 35 to restrain an excessive damping force. Adjusting the cross sectional flow area of the pilot valve 33 by the actuator 34 enables the orifice characteristic to be directly controlled, and also enables the pilot pressure of the main valve 35 to be changed to adjust the valve characteristic.

When the piston rod 6 is in the compressing stroke, the check valve 10 is opened, and the pressure in the upper chamber 2a is substantially the same as that in the lower chamber 2b. The retraction of the piston rod 6 into the cylinder 2 increases the hydraulic fluid pressure within the cylinder 2. By the same amount as the piston rod 6 comes into the cylinder 2, hydraulic fluid flows from the lower chamber 2b into the oil passage 27 through the oil passage 19, the annular oil passage 18 and the connecting pipe 22 (in this condition, since the pressure in the upper chamber 2a is substantially the same as that in the lower chamber 2b, the hydraulic fluid does not flow along the path as shown in the solid line). When the damping force is to be weak, an orifice H is adjusted to be closed or small, thereby causing the main valve 35 to be moved down as viewed in FIG. 14, which valve 35 is slidably fitted onto the element D constituting the contracting side valve 30. Accordingly, the hydraulic fluid coming into the oil passage 27 further follows the path as shown in the dotted line of FIG. 14. The downward movement of the main valve 35 allows a gap to be created between contracting side valve seat F and the main valve 35. Thereby the hydraulic fluid flows into the oil passage 28 through the gap, and further flows from the oil passage 28 into the reservoir 4 through the connecting hole 23.

When the damping force is to be strong, the orifice H is adjusted to be open or large, thereby not causing the main valve 35 to be moved down. Accordingly, the hydraulic fluid coming into the oil passage 27 follows the path as shown in the dotted line of FIG. 15.

The provision of the baffle plate 37 causes the flow velocity of the hydraulic fluid flowing from the connecting hole 23 to the reservoir 4 to be gradually lowered at the entrance portion 23b during the compressing stroke, thereby substantially preventing the flow of the hydraulic fluid from leaving a wall surface 20a (or circumferential wall surface surrounding the opening 23a) of the connecting plate 20 to restrain the generation of the eddies, and thereby restraining the generation of bubbles caused by the eddies and the penetration of gas into the hydraulic fluid to prevent cavitation and aeration to thus provide a stable damping force.

Even if the eddies are generated, the provision of the baffle plate 37 above the opening 23a of the connecting hole 23 within the reservoir 4 enables the eddies to be generated at the entrance portion 23b of the connecting hole 23, which is located at a distance or separated from the hydraulic fluid level S of the reservoir 4, thereby preventing the eddies and the bubbles from being generated about the hydraulic fluid level S, so as to restrain penetration of the gas into the hydraulic fluid.

Restraining the generation of the bubbles in reservoir 4 and the penetration of the gas into the hydraulic fluid during the compressing stroke, the flow of the hydraulic fluid from the reservoir 4 into the lower cylinder chamber 2b through the oil passage 11 of the base valve 8 during the extending stroke causes bubbles to be hardly generated in lower cylinder chamber 2b, thereby preventing cavitation and aeration so as to provide a stable damping force not only in the compressing stroke, but also in the extending stroke.

Figure 10:
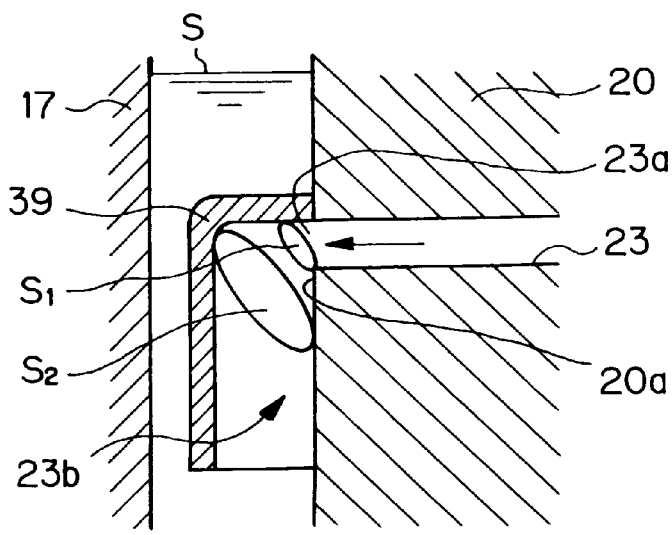
FIG. 10 is a schematic sectional view showing, on an enlarged scale, an entrance portion from a connecting hole to a reservoir, which is a main portion of the apparatus shown in FIG. 4.

A second embodiment of the hydraulic shock absorber according to the present invention will be described below with reference to FIGS. 4, 5, and 10. It should be noted that the second embodiment is substantially identical to the first embodiment except for the construction of the baffle plate. Thus, in the second embodiment, common elements have been given the same reference numerals, and only the differences in construction will be described below in detail.

Figure 4:
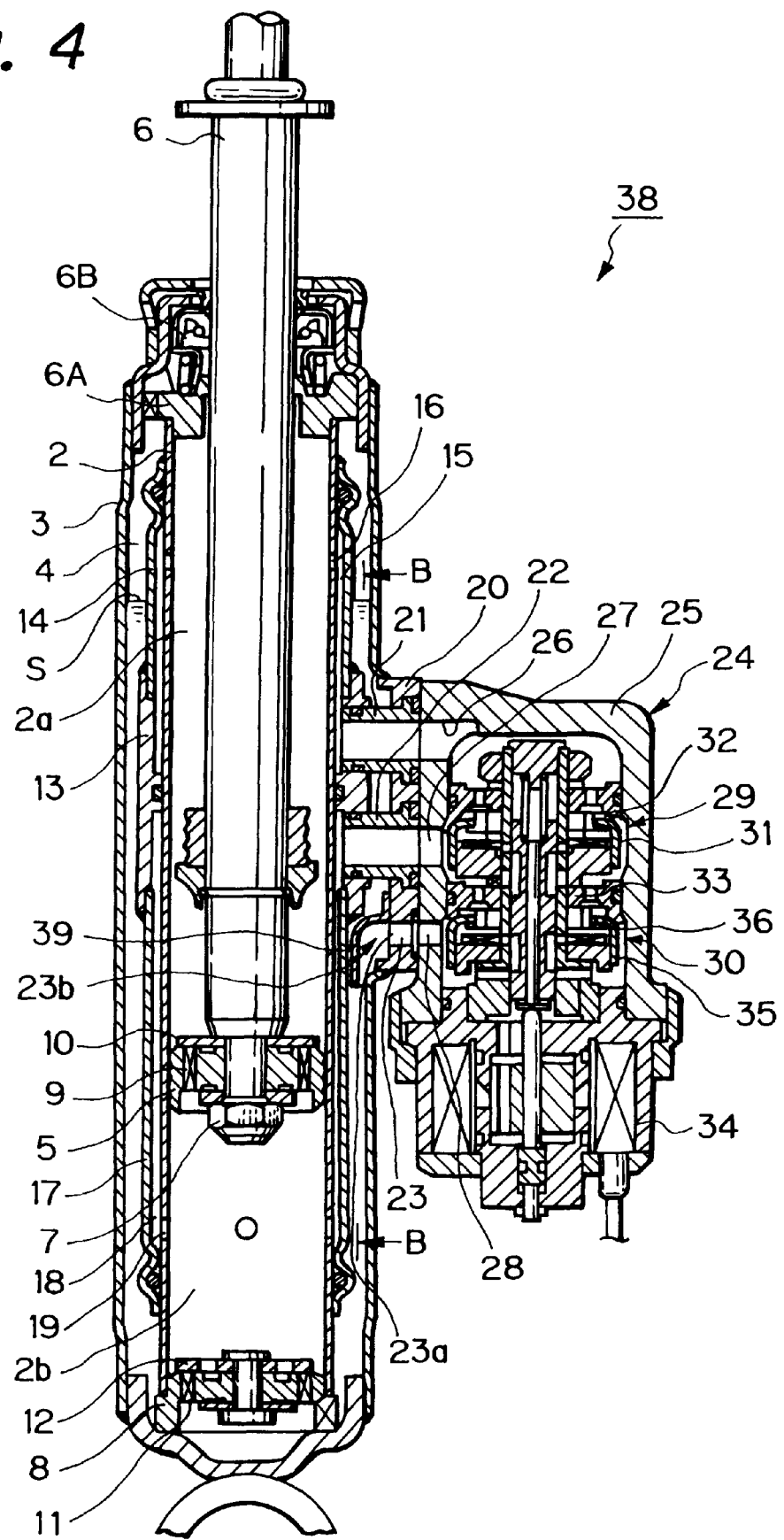
FIG. 4 is a vertical section of a hydraulic shock absorber according to a second embodiment of the present invention.
Figure 5:
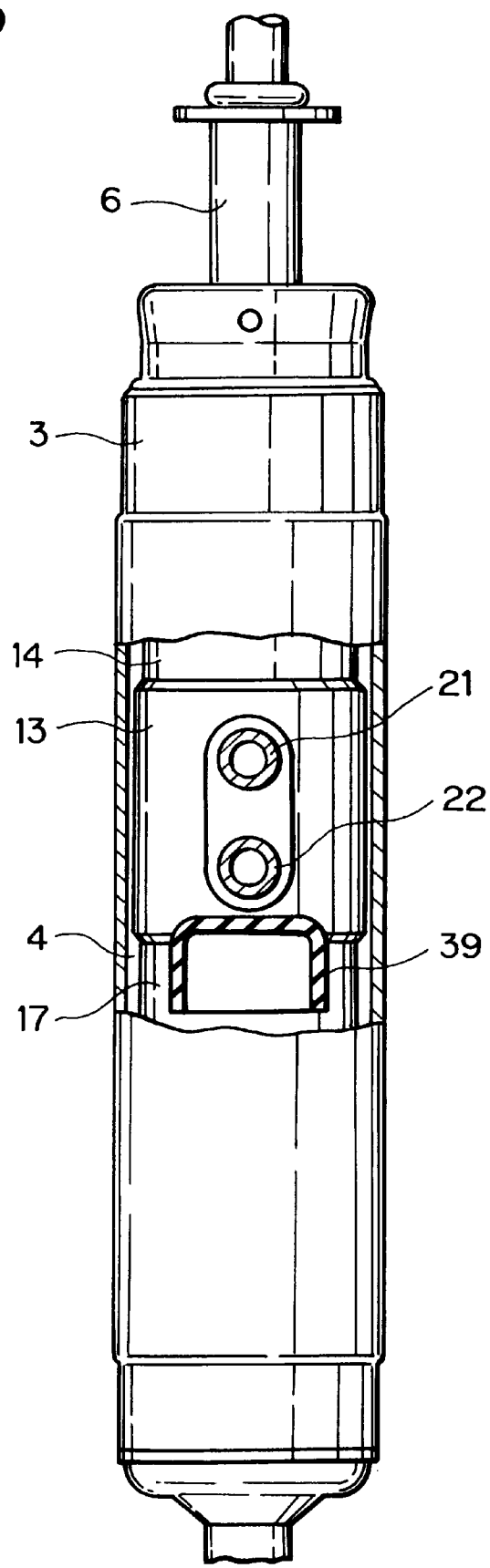
FIG. 5 is a partially cutaway view taken on along B—B of FIG. 4.

As shown in FIGS. 4 and 5, a damping force adjusting type of hydraulic shock absorber 38 according to the second embodiment comprises a baffle plate 39 in place of the baffle plate 37 of the first embodiment. The baffle plate 39 has a box-like shape and is mounted on the connecting plate 20 to cover the upper and lateral sides of the opening 23a of the connecting hole 23. The entrance portion 23b of the connecting hole 23 (as the second hydraulic fluid passage to the reservoir 4) is shaped to gradually decrease the flow velocity of the hydraulic fluid flowing from the connecting hole 23 into the reservoir 4. With reference to FIG. 10, arrangement of the baffle plate 39 above the opening 23a of the connecting hole 23 defines the entrance portion 23b as comprising a flow path through which the hydraulic fluid flows from the connecting hole 23 to the reservoir 4. The flow path of the entrance portion 23b has a cross sectional flow area which is gradually expanded, as shown by reference marks $S_1$ and $S_2$, to gradually lower the flow velocity of the hydraulic fluid (see FIG. 10).

According to the second embodiment employing the above construction, in the same manner as the first embodiment, the provision of the baffle plate 39 enables the flow velocity of the hydraulic fluid flowing from the connecting hole 23 to the reservoir 4 to be gradually lowered at the entrance portion 23b, thereby substantially preventing the flow of the hydraulic fluid from leaving the wall surface 20a of the connecting plate 20 to restrain the generation of the eddies. The provision of the box-like baffle plate 39 also enables the eddies to be generated at the entrance portion 23b of the connecting hole 23, which is located at a distance or separated from the hydraulic fluid level S of the reservoir 4, thereby preventing the eddies and the bubbles from being generated about the hydraulic fluid level S to thereby prevent cavitation and aeration to thus provide a stable damping force.

A third embodiment of the hydraulic shock absorber according to the present invention will be described below with reference to FIGS. 6, 7 and 8. It should be noted that the third embodiment is substantially identical to the first and second embodiments, except for the construction of the baffle plate and the connecting hole. Thus, in the third embodiment, common elements have been given the same reference numerals, and only the differences in construction will be described below in detail with reference to the drawings.

Figure 6:
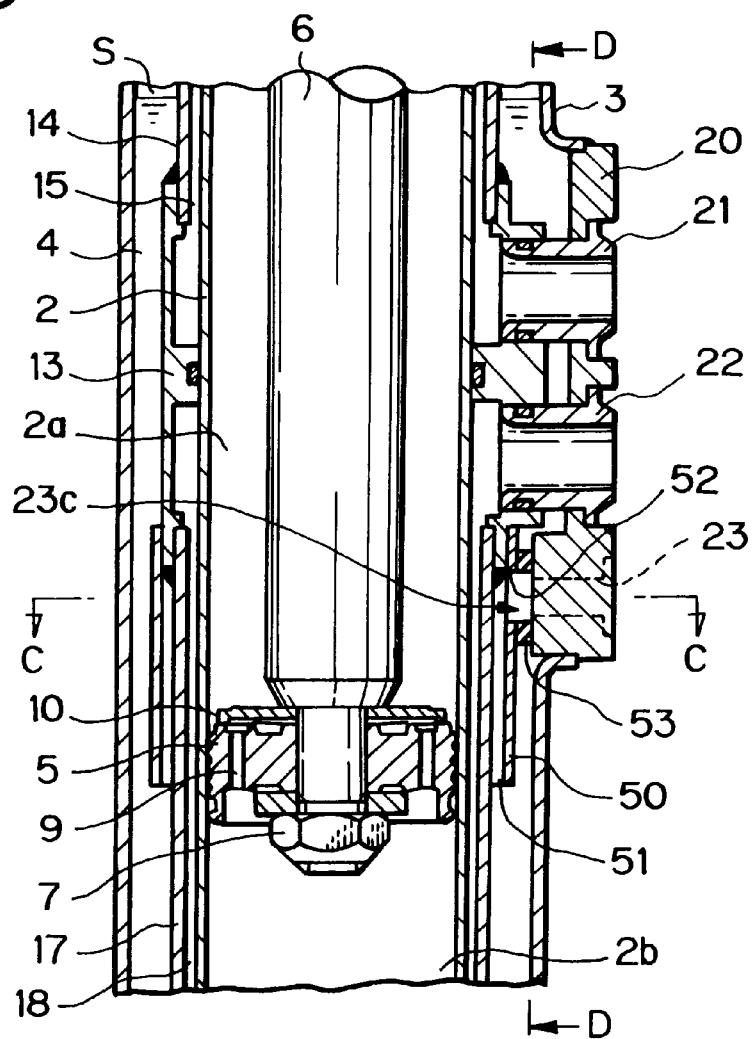
FIG. 6 is a vertical section showing the main portion of a hydraulic shock absorber according to a third embodiment of the present invention.
Figure 7:
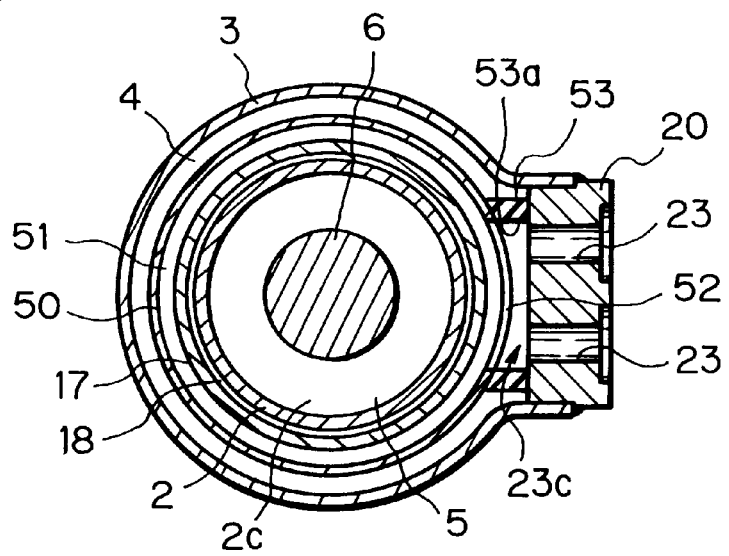
FIG. 7 is a cross sectional view taken along line C—C of FIG. 6.
Figure 8:
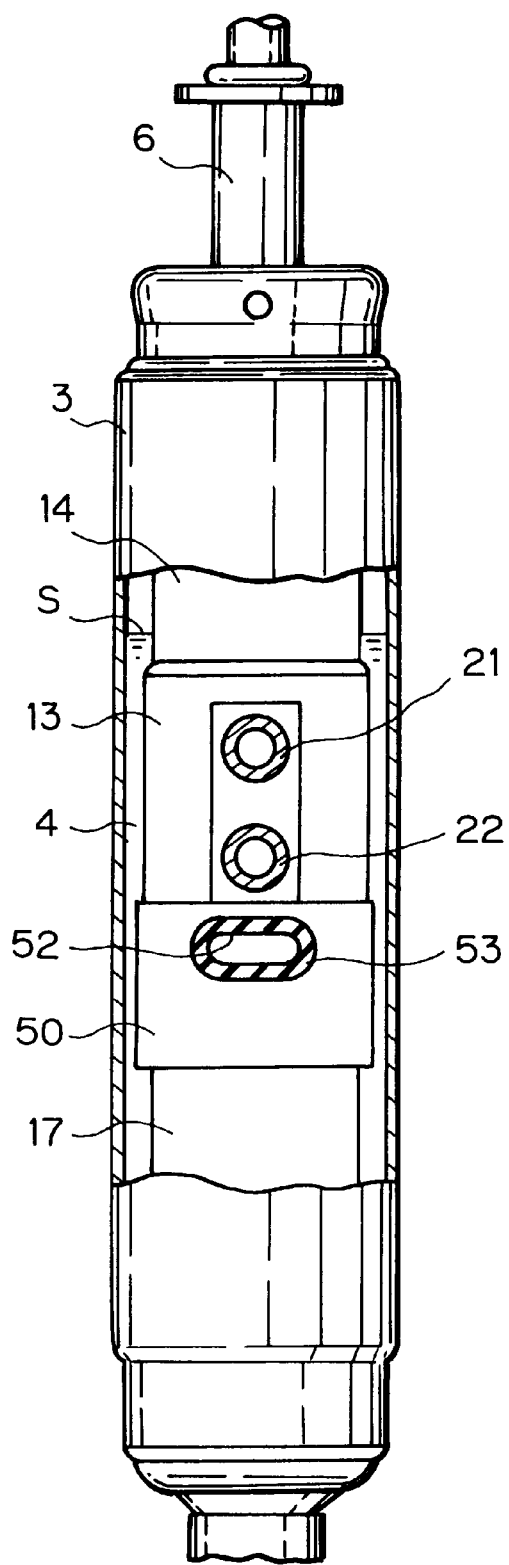
FIG. 8 is a partially cutaway view taken along line D—D of FIG. 6.

As shown in FIGS. 6, 7, and 8, a damping force adjusting type of hydraulic shock absorber according to the third embodiment comprises a cylindrical baffle plate 50 provided within the reservoir 4 in place of the baffle plate 37 of the first embodiment. The baffle plate 50 is larger than the lower tube 17 in diameter. The upper end portion of the baffle plate 50 is fitted around the lower portion of the passage element 13 so that the baffle plate 50 is fixedly provided within the reservoir 4. An annular flow path 51 is defined between the baffle plate 50 and the lower tube 17. The annular flow path 51 has an upper end portion which is closed by the passage element 13 and a lower end portion which is open to face the lower portion of the reservoir 4.

The baffle plate 50 has an opening 52 formed therein to be opposed to connecting holes 23 and 23 (as the second hydraulic fluid passage) of the connecting plate 20. In the third embodiment, the connecting plate 20 has a pair of connecting holes 23 and 23 provided therein side by side (see FIG. 7). The opening 52 of the baffle plate 50 comprises an oblong hole the cross sectional area of which is slightly larger than that of the openings of the connecting holes 23 and 23 (see FIG. 8). A tubular passage element 53 is interposed between the connecting plate 20 and the baffle plate 50. The tubular passage element 53 includes a flow path 53a having the same oblong hole-like shape as the opening 52 of the baffle plate 50. The flow path 53a of the tubular passage element 53 communicates between the two connecting holes 23 and 23 and the opening 52 of the baffle plate 50. The tubular passage element 53 is formed from a resilient material such as synthetic resin, rubber, and so on. The tubular passage element 53 is tightly attached to the connecting plate 20 and the baffle plate 50 to communicate between the connecting holes 23 and 23 and the opening 52 of the baffle plate 50 without leakage.

As mentioned above, the annular flow path 51 has the upper end portion or opening which is closed by the lower end of the passage element 13. An entrance portion 23c communicating between the connecting holes 23 and 23 and the reservoir 4 is constituted by the flow path 53a of the tubular passage element 53, the opening 52 of the baffle plate 50, and the annular flow path 51 defined between the baffle plate 50 and the lower tube 17. The entrance portion 23c has a flow path through which the hydraulic fluid flows from the connecting holes 23 and 23 to the reservoir 4. The entrance portion 23c is shaped so that the cross sectional flow area thereof, extending from the connecting holes 23 and 23 to the tubular passage element 53, is slightly larger than that of the connecting holes 23 and 23. Since the upper end portion of the annular flow path 51 is closed by the passage element 13 and the lower end portion of the annular flow path 51 is open, the entrance portion 23c is also shaped so that the cross sectional flow area thereof extending from the opening 52 of the baffle plate 50 to the annular flow path 51 is gradually expanded. Thus, the entrance portion 23c enables the flow velocity of the hydraulic fluid flowing from the connecting holes 23 and 23 to the reservoir 4 to be gradually lowered.

According to the third embodiment employing the above construction, in the same manner as the first and second embodiments, the provision of the baffle plate 50 enables the flow velocity of the hydraulic fluid flowing from the connecting holes 23 and 23 to the reservoir 4 to be gradually lowered at the entrance portion 23c, thereby substantially preventing the flow of the hydraulic fluid from leaving the wall surface of the connecting plate 20 to restrain generation of the eddies. Since the upper end portion of the annular flow path 51 is closed by the passage element 13, it allows the eddies to be generated at the entrance portion 23c which is separated from the hydraulic fluid level S of the reservoir 4, thereby preventing the eddies and the bubbles from being generated about the hydraulic fluid level S to thereby prevent cavitation and aeration to thus provide a stable damping force.

Figure 11:
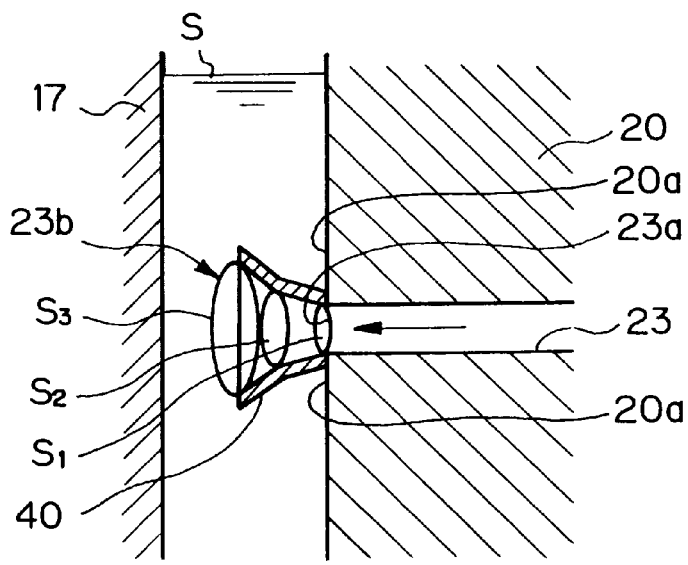
FIG. 11 is a schematic sectional view showing, on an enlarged scale, an entrance portion from a connecting hole to a reservoir, which is a main portion of a hydraulic shock absorber according to an alternative embodiment of the present invention.
Figure 12:
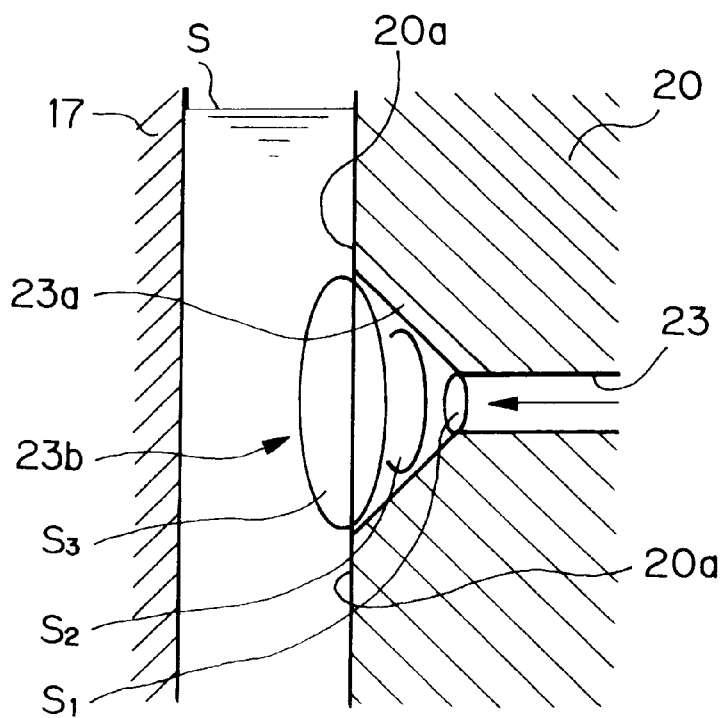
FIG. 12 is a schematic sectional view showing, on an enlarged scale, an entrance portion from a connecting hole to a reservoir, which is a main portion of a hydraulic shock absorber according to another alternative embodiment of the present invention.
Figure 13:
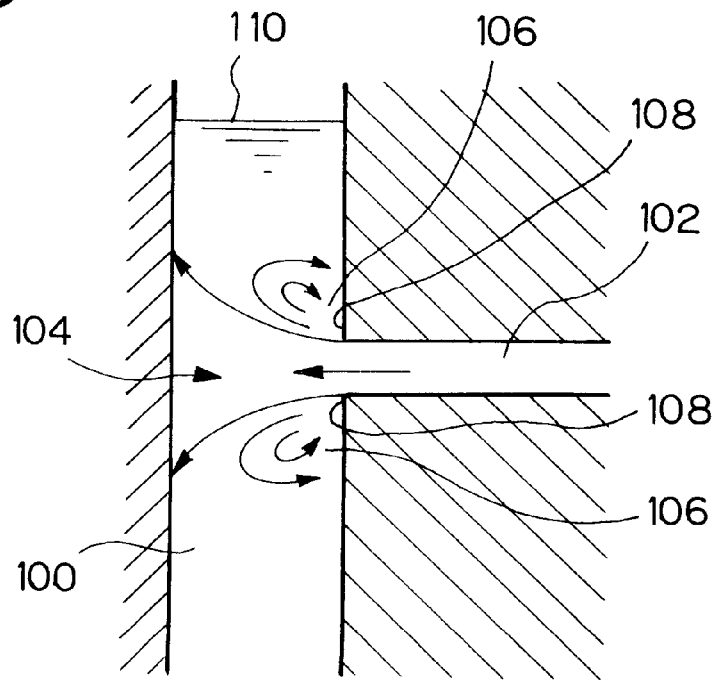
FIG. 13 is a schematic sectional view showing, on an enlarged scale, an entrance portion from a connecting hole to a reservoir which is provided in the hydraulic fluid passage of a typical hydraulic shock absorber in related background art.

In the first, second, and third embodiments, the cross sectional flow areas of the entrance portions 23b and 23c are constructed so as to be gradually expanded by the baffle plates 37, 39, and 50, respectively. In an alternative embodiment, a diffuser 40 as shown in FIG. 11 can be employed for providing an entrance portion. The diffuser 40 has a cross sectional flow area which is gradually expanded as shown by reference marks $S_1$, $S_2$ and $S_3$. The diffuser 40 is provided around the opening 23a of the connecting hole 23 to constitute an entrance portion 23b. The cross sectional flow area of the entrance portion 23b is gradually expanded as shown by reference marks $S_1$, $S_2$ and $S_3$. In another alternative embodiment, as shown in FIG. 12, the connecting hole 23 includes an opening 23a having a cross sectional flow area which is gradually expanded as the second hydraulic fluid passage extends to the reservoir (as shown by reference marks $S_1$, $S_2$ and $S_3$).

According to each of the above two alternative embodiments, since the cross sectional area of the flow path communicating between the connecting hole and the reservoir is also gradually expanded, generation of the eddies can be restrained at the entrance portion, thereby preventing cavitation and aeration, so as to provide a stable damping force.

It should be noted that the present invention is not limited to the hydraulic shock absorber of the type shown in the above embodiments. The present invention can be applied to any type of hydraulic shock absorber comprising a reservoir containing hydraulic fluid and gas sealed therein in the same manner as the foregoing embodiments by providing the cross sectional flow area of the entrance portion with a gradually expanding configuration or a shape expanding step by step (for example, as shown in FIGS. 9 to 12).

According to the hydraulic shock absorber of the present invention, the flow velocity of the hydraulic fluid flowing from the second hydraulic fluid passage into the reservoir can be gradually lowered at the entrance portion to the reservoir, thereby substantially preventing the flow of the hydraulic fluid from leaving the wall surface and restraining the generation of the eddies. Arrangement of the baffle plate enables the generation of the eddies to be separated from the hydraulic fluid level of the reservoir, thereby restraining generation of the bubbles caused by the eddies and penetration of the gas into the hydraulic fluid to prevent cavitation and aeration to thus provide a stable damping force.

What is claimed is:

1. A hydraulic shock absorber comprising:
    a cylinder containing hydraulic fluid sealed therein;
    a reservoir containing hydraulic fluid and gas sealed therein;
    a piston slidably fitted in said cylinder for dividing the interior of said cylinder into two cylinder chambers;
    a piston rod including one end connected to said piston and an opposite end extending out of said cylinder;
    a first hydraulic fluid passage communicating between said two cylinder chambers;
    a second hydraulic fluid passage communicating between one of said two cylinder chambers and said reservoir; and
    means for controlling flow of said hydraulic fluid in said first and second hydraulic fluid passages caused by the stroke of said piston rod to generate a damping force;
    said hydraulic shock absorber further including an entrance portion from said second hydraulic fluid passage to said reservoir, said entrance portion being shaped to gradually decrease the flow velocity of said hydraulic fluid flowing from said second hydraulic fluid passage into said reservoir;
    said second hydraulic fluid passage including an opening communicating with said reservoir through said entrance portion;
    said hydraulic shock absorber further comprising a baffle plate provided within said reservoir and above said opening of said second hydraulic fluid passage;
    said baffle plate including, at opposite sides thereof, projections extending downwardly to cover an upper side of said opening; and
    said baffle plate defining said entrance portion.

2. A hydraulic shock absorber according to claim 1, wherein said baffle plate has a box-like shape to cover the upper and lateral sides of said opening.

3. A hydraulic shock absorber according to claim 2, wherein said baffle plate is fabricated of a resilient material.

4. A hydraulic shock absorber according to claim 1, wherein said baffle plate is fabricated of a resilient material.

5. A hydraulic shock absorber comprising:
    a cylinder containing hydraulic fluid sealed therein;
    a reservoir containing hydraulic fluid and gas sealed therein:
    a piston slidably fitted in said cylinder for dividing the interior of said cylinder into two cylinder chambers;
    a piston rod including one end connected to said piston and an opposite end extending out of said cylinder;
    a first hydraulic fluid passage communicating between said two cylinder chambers;
    a second hydraulic fluid passage communicating between one of said two cylinder chambers and said reservoir; and
    means for controlling flow of said hydraulic fluid in said first and second hydraulic fluid passages caused by the stroke of said piston rod to generate a damping force;
    said hydraulic shock absorber further including an entrance portion from said second hydraulic fluid passage to said reservoir, said entrance portion being shaped to gradually decrease the flow velocity of said hydraulic fluid flowing from said second hydraulic fluid passage into said reservoir;
    an outer cylindrical case and a cylindrical baffle plate provided between said outer cylindrical case and said cylinder, said cylinder and said outer cylindrical case defining therebetween said reservoir, and said baffle plate including an opening which is larger than said second hydraulic fluid passage and which is positioned to face thereto;

a passage element provided between said baffle plate and said second hydraulic fluid passage, said passage element including a passage communicating between said second hydraulic fluid passage and said opening of said baffle plate, and being larger than said second hydraulic fluid passage and smaller than said opening of said baffle plate, said passage of said passage element and said opening of said baffle plate defining said entrance portion.

6. A hydraulic shock absorber according to claim 5, wherein an annular passage is defined between said baffle plate and said cylinder and communicates between said opening of said baffle plate and said reservoir.

7. A hydraulic shock absorber according to claim 6, wherein said baffle plate is fabricated of a resilient material.

8. A hydraulic shock absorber according to claim 5, wherein said baffle plate is fabricated of a resilient material.

9. A hydraulic shock absorber comprising:
a cylinder containing hydraulic fluid sealed therein;
a reservoir containing hydraulic fluid and gas sealed therein;
a piston slidably fitted in said cylinder for dividing the interior of said cylinder into two cylinder chambers;
a piston rod including one end connected to said piston and an opposite end extending out of said cylinder;
a first hydraulic fluid passage communicating between said two cylinder chambers;
a second hydraulic fluid passage communicating between one of said two cylinder chambers and said reservoir; and
means for controlling flow of said hydraulic fluid in said first and second hydraulic fluid passages caused by the stroke of said piston rod to generate a damping force; and
a cylindrical baffle provided around the cylinder within the reservoir for gradually decreasing the flow velocity of said hydraulic fluid flowing from said second hydraulic fluid passage into said reservoir.

10. A hydraulic shock absorber according to claim 9, wherein an annular space is defined between the cylindrical baffle and the cylinder and the hydraulic fluid is guided through said annular space to flow into said reservoir.

11. A hydraulic shock absorber according to claim 9, wherein said cylindrical baffle is fabricated of a resilient material.

12. A hydraulic shock absorber according to claim 9, wherein said two cylinder chambers include a lower cylinder chamber and an upper cylinder chamber, and wherein said second hydraulic fluid passage communicates between said lower cylinder chamber and said reservoir.

13. A hydraulic shock absorber comprising:
a cylinder containing hydraulic fluid sealed therein;
a reservoir containing hydraulic fluid and gas sealed therein;
a piston slidably fitted in said cylinder for dividing the interior of said cylinder into two cylinder chamber;
a piston rod including one end connected to said piston and an opposite end extending out of said cylinder;
a first hydraulic fluid passage communicating between said two cylinder chambers;
a second hydraulic fluid passage communicating between one of said two cylinder chambers and said reservoir;
means for controlling flow of said hydraulic fluid in said first and second hydraulic fluid passages caused by the stroke of said piston rod to generate a damping force;
a cylindrical baffle provided around the cylinder within the reservoir for directing the hydraulic fluid to the reservoir, said cylindrical baffle defining an entrance portion extending from said second hydraulic fluid passage to said reservoir, said entrance portion being shaped to gradually decrease the flow velocity of said hydraulic fluid flowing from said second hydraulic fluid passage into said reservoir.

14. A hydraulic shock absorber according to claim 13, wherein said entrance portion has an annular space which is defined between the cylindrical baffle and the cylinder, and wherein the hydraulic fluid is guided through the annular space to flow into the reservoir while the flow velocity of the hydraulic fluid is gradually lowered.

15. An apparatus for preventing generation of bubbles adapted to be applied to a hydraulic shock absorber, said hydraulic shock absorber comprising
a cylinder containing hydraulic fluid sealed therein;
a reservoir containing hydraulic fluid and gas sealed therein;
a piston slidably fitted in said cylinder for dividing the interior of said cylinder into two cylinder chambers;
a piston rod including one end connected to said piston and an opposite end extending out of said cylinder;
a first hydraulic fluid passage communicating between said two cylinder chambers;
a second hydraulic fluid passage communicating between one of said two cylinder chambers and said reservoir;
means for controlling flow of said hydraulic fluid in said first and second hydraulic fluid passages caused by the stroke of said piston rod to generate a damping force; and
a cylindrical baffle provided around the cylinder within the reservoir for gradually decreasing the flow velocity of said hydraulic fluid flowing from said second hydraulic fluid passage into said reservoir.

* * * * *